United States Patent
Xu et al.

(10) Patent No.: US 11,176,107 B2
(45) Date of Patent: Nov. 16, 2021

(54) PROCESSING DATA RECORDS IN A MULTI-TENANT ENVIRONMENT TO ENSURE DATA QUALITY

(71) Applicant: International Business Machines Corporation, Armonk, NY (US)

(72) Inventors: Yifan Xu, Redmond, WA (US); James Natale, Hudson, OH (US); Matthew Hagenbuch, Brecksville, OH (US); Matthew M. Pohlman, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/212,939

(22) Filed: Dec. 7, 2018

(65) Prior Publication Data

US 2020/0183899 A1     Jun. 11, 2020

(51) Int. Cl.
    *G06F 16/215*     (2019.01)
    *G06F 16/23*     (2019.01)

(52) U.S. Cl.
    CPC ........ *G06F 16/215* (2019.01); *G06F 16/2365* (2019.01)

(58) Field of Classification Search
    CPC .......................... G06F 16/215; G06F 16/2365
    See application file for complete search history.

(56) References Cited

U.S. PATENT DOCUMENTS

| | | | |
|---|---|---|---|
| 10,185,728 B2* | 1/2019 | Nath | G06N 20/00 |
| 2016/0070725 A1* | 3/2016 | Marrelli | G06F 16/84 |
| | | | 707/692 |
| 2017/0169171 A1 | 6/2017 | Loeb et al. | |
| 2018/0011974 A1 | 1/2018 | Schneider et al. | |
| 2018/0121607 A1 | 5/2018 | Bastide et al. | |
| 2018/0197625 A1 | 7/2018 | Lobach | |

OTHER PUBLICATIONS

Kahn et al. "A pragmatic framework for single-site and multisite data quality assessment in electronic health record-based clinical research." Medical care 50 (2012).

(Continued)

*Primary Examiner* — Irete F Ehichioya
*Assistant Examiner* — Xiaoqin Hu
(74) *Attorney, Agent, or Firm* — Steven Bouknight; Edell, Shapiro & Finnan, LLC

(57) ABSTRACT

A computer system processes data records in a multi-tenant environment to ensure data quality. A plurality of records from a plurality of data sources are processed to provide a data quality metric for each field of the plurality of records based on record values in the field. A threshold range satisfying a specificity level of a data source is selected for each data quality metric. The data quality metric is compared to the threshold range to determine whether the data quality metric violates the threshold. A data quality report is provided for the plurality of records, wherein the data quality report indicates whether the data quality metric of each field violates the selected threshold range. Embodiments of the present invention further include a method and program product for processing data records in a multi-tenant environment to ensure data quality in substantially the same manner described above.

15 Claims, 11 Drawing Sheets

| EHR SYSTEM | FACILITY TYPE | DEPARTMENT TYPE | FACILITY ID | DEPARTMENT ID | FIELD | METRIC | SCORES | THRESHOLD ROW | THRESHOLDS |
|---|---|---|---|---|---|---|---|---|---|
| EPIC | HOSPITAL | LABOR AND DELIVERY | E4112 | LD043 | BIRTHDATE | TODAY | 0, 12, 8, 16 | 4 | 48% - 52% |
| EPIC | HOSPITAL | LABOR AND DELIVERY | F5023 | 403-4DE01 | BIRTHDATE | TODAY | 0, 12, 0, 0 | 2 | 40% - 60% |
| EPIC | HOSPITAL | ONTOLOGY | E4112 | ONT9432 | BIRTHDATE | TODAY | 0, -4, 8, 0 | 3 | 0% - 1% |
| EPIC | OUTPATIENT | LABORATORY | 043-10012 | LD043 | BIRTHDATE | TODAY | 0, -12, -8, -16 | 1 | 0% - 5% |

(56) References Cited

OTHER PUBLICATIONS

Christen et al., "Quality and complexity measures for data linkage and deduplication." Quality measures in data mining. Springer, Berlin, Heidelberg, 2007. 127-151.
Robertson et al. "The lot quality technique: a global review of applications in the assessment of health services and disease surveillance." World health statistics quarterly 50 (1997): 199-209.
Boonstra et al., "Implementing electronic health records in hospitals: a systematic literature review." BMC health services research 14.1 (2014): 370.
Li et al. "Securing personal health records in cloud computing: Patient-centric and fine-grained data access control in multi-owner settings." International conference on security and privacy in communication systems. Springer, Berlin, Heidelberg, 2010.

* cited by examiner

| CUSTOMER | SYSTEM | ID | GENDER | BIRTH YEAR |
|---|---|---|---|---|
| K1 | K2A | 1142 | M | 1901 |
| K1 | K2A | 1143 | F | <NULL> |
| K1 | K2A | 1144 | UNKNOWN | <NULL> |
| K1 | K2B | <NULL> | F | 1920 |
| K1 | K2B | <NULL> | F | 1930 |

FIG.3A

| KEY | METRIC | RESULT |
|---|---|---|
| K1, K2A, valueA | NULL_COUNT | 0 |
| K1, K2A, valueA | DISTINCT_COUNT | 3 |
| K1, K2A, valueB | NULL_COUNT | 0 |
| K1, K2A, valueB | DISTINCT_COUNT | 3 |
| K1, K2A, valueC | NULL_COUNT | 2 |
| K1, K2A, valueC | DISTINCT_COUNT | 1 |
| K1, K2B, valueA | NULL_COUNT | 2 |
| K1, K2B, valueA | DISTINCT_COUNT | 0 |
| K1, K2B, valueB | NULL_COUNT | 0 |
| K1, K2B, valueB | DISTINCT_COUNT | 1 |
| K1, K2B, valueC | NULL_COUNT | 0 |
| K1, K2B, valueC | DISTINCT_COUNT | 2 |

FIG.3D

| ROW NUMBER | POPULATION LEVEL-1 | POPULATION LEVEL-2 | POPULATION LEVEL-3 | FIELD | METRIC | THRESHOLDS |
|---|---|---|---|---|---|---|
| 1 | * | * | * | BIRTHDATE | FUTURE % | 0% - 1% |
| 2 | * | * | * | Dx CODE | ICD % | 50% - 100% |
| 3 | TENANT 1 | HOSPITAL 1 | * | Dx CODE | ICD % | 0% - 100% |
| 4 | TENANT 1 | HOSPITAL 1 | BILLING DEPT. | Dx CODE | ICD % | 95% - 100% |

FIG.4A

| POPULATION LEVEL-1 | POPULATION LEVEL-2 | POPULATION LEVEL-3 | FIELD | METRIC | METRIC VALUE | MATCHED THRESHOLD ROW | MATCHED THRESHOLDS | QUALITY |
|---|---|---|---|---|---|---|---|---|
| TENANT 1 | HOSPITAL 1 | LAB 1 | BIRTHDATE | FUTURE % | 0% | 1 | 0% - 1% | GOOD |
| TENANT 2 | HOSPITAL 2 | LAB 2 | Dx CODE | ICD % | 30% | 2 | 50% - 100% | BAD |
| TENANT 1 | HOSPITAL 1 | LAB 2 | Dx CODE | ICD % | 30% | 3 | 0% - 100% | GOOD |
| TENANT 1 | HOSPITAL 1 | BILLING DEPT. | Dx CODE | ICD % | 99% | 4 | 95% - 100% | GOOD |

FIG. 4B

| EHR SYSTEM | FACILITY TYPE | DEPARTMENT TYPE | FACILITY ID | DEPARTMENT ID | FIELD | METRIC | THRESHOLDS |
|---|---|---|---|---|---|---|---|
| * | * | * | * | * | BIRTHDATE | TODAY | 0% - 5% |
| * | HOSPITAL | LABOR AND DELIVERY | * | * | BIRTHDATE | TODAY | 40% - 60% |
| * | * | * | E4112 | * | BIRTHDATE | TODAY | 0% - 1% |
| * | * | * | E4112 | LD043 | BIRTHDATE | TODAY | 48% - 52% |

FIG.5A

| | EHR SYSTEM | FACILITY TYPE | DEPARTMENT TYPE | FACILITY ID | DEPARTMENT ID |
|---|---|---|---|---|---|
| WEIGHT | 1 | 4 | 8 | 8 | 8 |

| EHR SYSTEM | FACILITY TYPE | DEPARTMENT TYPE | FACILITY ID | DEPARTMENT ID | FIELD | METRIC | SCORES | THRESHOLD ROW | THRESHOLDS |
|---|---|---|---|---|---|---|---|---|---|
| EPIC | HOSPITAL | LABOR AND DELIVERY | E4112 | LD043 | BIRTHDATE | TODAY | 0, 12, 8, 16 | 4 | 48% - 52% |
| EPIC | HOSPITAL | LABOR AND DELIVERY | F5023 | 403-4DE01 | BIRTHDATE | TODAY | 0, 12, 0, 0 | 2 | 40% - 60% |
| EPIC | HOSPITAL | ONTOLOGY | E4112 | ONT9432 | BIRTHDATE | TODAY | 0, -4, 8, 0 | 3 | 0% - 1% |
| EPIC | OUTPATIENT | LABORATORY | 043-10012 | LD043 | BIRTHDATE | TODAY | 0, -12, -8, -16 | 1 | 0% - 5% |

PROCESSING DATA RECORDS IN A MULTI-TENANT ENVIRONMENT TO ENSURE DATA QUALITY

BACKGROUND

1. Technical Field

Present invention embodiments relate to processing data records, and more specifically, to processing data records in a multi-tenant environment to ensure data quality.

2. Discussion of the Related Art

A multi-tenant environment refers to a software architecture in which a single instance of software runs on a server and serves multiple tenants. Each tenant may include a group of clients who are provided with a dedicated share of the instance, including its data, configuration, user management, and the like. Ensuring that data records meet certain quality standards may be essential for downstream processes. However, ensuring the quality of data records may be difficult in a multi-tenant environment due to the large volume of data that can be generated by numerous tenants. Furthermore, each tenant may employ different data storage schemas and formats.

SUMMARY

According to one embodiment of the present invention, a computer system processes data records in a multi-tenant environment to ensure data quality. A plurality of records from a plurality of data sources are processed to provide a data quality metric for each field of the plurality of records based on record values in the field. A threshold range is selected for each data quality metric, wherein the threshold range is selected from a plurality of threshold ranges and satisfies a specificity level corresponding to the data source. The data quality metric is compared to the threshold range to determine whether the data quality metric violates the threshold. A data quality report is provided for the plurality of records, wherein the data quality report indicates whether the data quality metric of each field violates the selected threshold range. Embodiments of the present invention further include a method and program product for processing data records in a multi-tenant environment to ensure data quality in substantially the same manner described above.

BRIEF DESCRIPTION OF THE DRAWINGS

Generally, like reference numerals in the various figures are utilized to designate like components.

FIGS. 3A-3D are tables depicting stages of processing data records in accordance with an embodiment of the present invention;

FIG. 4A is a table depicting data quality thresholds in accordance with an embodiment of the present invention FIG. 4B is a table depicting a data quality report in accordance with an embodiment of the present invention;

FIGS. 5A-5C are tables depicting a thresholding schema in accordance with an embodiment of the present invention.

DETAILED DESCRIPTION

Figure 1:
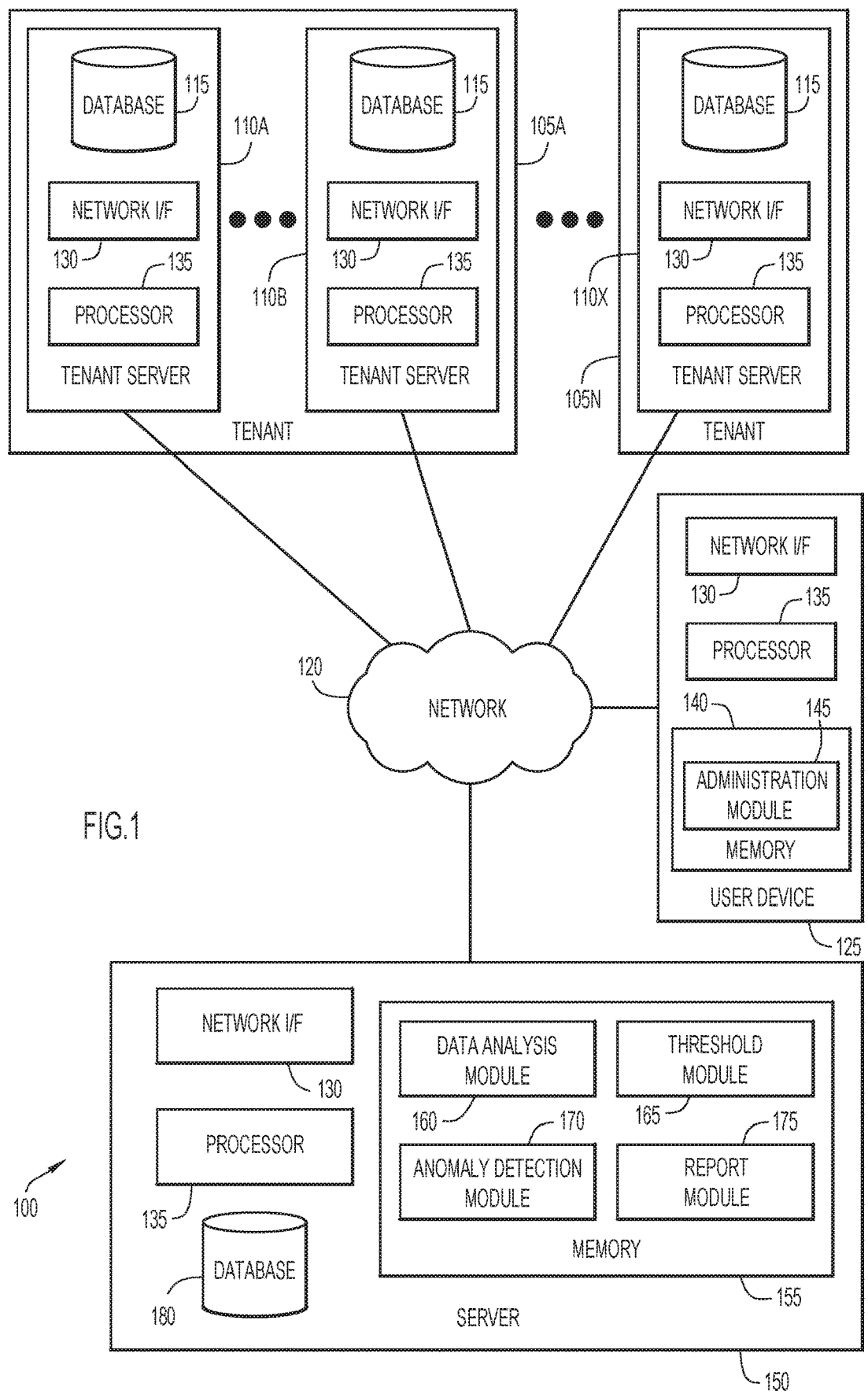
FIG. 1 is a block diagram depicting a computing environment for ensuring the quality of data records in accordance with an embodiment of the present invention.

Present invention embodiments relate generally to processing data records, and more specifically, to processing data records in a multi-tenant environment to ensure data quality. Ensuring record quality in a multi-tenant environment may be difficult since the unique practices of each tenant may preclude application of a standardized approach to ensuring data quality. For example, in a multi-tenant environment relating to electronic healthcare records, each tenant may represent a different health care system, each of which may have multiple physical locations, electronic record systems, and data stores. In a large healthcare system, hundreds of millions of electronic healthcare records may be generated each day. Furthermore, different facilities may use distinct data storage schemas and formats, and duplicate or contradicting records may be generated by various departments of a facility. Records of each patient may be longitudinal by nature, and with various ontologies to describe the diagnoses, procedures, and tests associated with treatment of a patient, even simple treatments may require the creation of multiple records, such as demographic records, observational records, diagnoses, billing records, and the like.

Present invention embodiments ensure the quality of data records in a multi-tenant environment by incorporating a flexible thresholding scheme in which general thresholds can be set to apply to common variables across all population levels, and specific thresholds can be added for specific sub-populations. Raw data records may be analyzed in order to generate data quality metrics for each field of the records, and each data quality metric may be compared to a particular threshold range that is selected based on a level of specificity relating to the source of the data records. Instead of using data quality reporting for healthcare data that depends on explicit thresholding for every measurement, present invention embodiments provide intelligent defaults which continue to improve as thresholds and weights are tuned for various combinations of data source properties, thereby providing a more efficient mechanism for the detection of poor data quality.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for ensuring the quality of data records in accordance with an embodiment of the present invention. As depicted, computing environment 100 includes a plurality of tenants 105A-105N, a network 120, a user device 125, and a server 150. It is to be understood that the functional division among components of computing environment 100 have been chosen for purposes of explaining present invention embodiments and is not to be construed as a limiting example.

Each tenant 105A-105N may represent an organization and may include one or more sources of data within the organization, such as tenant servers 110A-110N. For example, tenant 105A may represent a first healthcare organization, and tenant 105B may represent a second healthcare organization. In this example, tenant server 110A may represent a particular department or sub-level of the first organization, such as an ambulatory department, and tenant server 110N may represent a billing department of the first organization. Similarly, tenant server 110X may represent a laboratory department of the second healthcare organization. It is to be understood that the depiction of the number of tenants and tenant servers of each tenant has been chosen for purposes of explaining present invention embodiments; various invention embodiments of computing environment 100 may include any number of tenants, each having any number of tenant servers from which data records may be collected. It is also to be understood that references to the healthcare industry and/or electronic healthcare records have been chosen for purposes of explaining present invention embodiments and should not be construed as limiting examples, as invention embodiments may ensure quality of data records pertaining to any field or domain of study.

Each tenant server, such as tenant servers 110A-110N of tenant 105A and tenant server 110X of tenant 105N, includes a database 115, a network interface 130, and a processor 135. Each tenant server 110 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 130 enables components of each tenant server 110 to send and receive data over a network, such as network 120. Each tenant server 110 may include internal and external hardware components, as depicted and described in further detail with respect to FIG. 6.

Each tenant server 110A-110N and 110X may include one or more databases, such as database 115. Database 115 may include any non-volatile storage media known in the art. For example, database 115 can be implemented with a tape library, optical library, one or more independent hard disk drives, or multiple hard disk drives in a redundant array of independent disks (RAID). Similarly, data on database 115 may conform to any suitable storage architecture known in the art, such as a file, a relational database, an object-oriented database, and/or one or more tables. Database 115 may store data corresponding to data records of a tenant. Records may be organized according to a hierarchy, with each database 115 corresponding to a particular hierarchical level of an organization.

Network 120 may include a local area network (LAN), a wide area network (WAN) such as the Internet, or a combination of the two, and includes wired, wireless, or fiber optic connections. In general, network 120 can be any combination of connections and protocols known in the art that will support communications between tenants 105A-105N, user device 125, and server 150 via their respective network interfaces 130 in accordance with embodiments of the present invention.

User device 125 includes memory 140, a network interface 130, and at least one processor 135. Memory 140 includes an administration module 145. In various embodiments of the present invention, each user device 125 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 130 enables components of each user device 125 to send and receive data over a network, such as network 120. Each client device 105 may include internal and external hardware components, as depicted and described in further detail with respect to FIG. 6.

Administration module 145 may include one or more modules or units to perform various functions of present invention embodiments described below. Administration module 145 may be implemented by any combination of any quantity of software and/or hardware modules or units, and may reside within memory 140 of user device 125 for execution by a processor, such as processor 135.

Administration module 145 may enable a user of user device 125 to monitor the quality of data records of tenants 105A-105N in order to ensure that the data records meet a certain level of quality. Administration module 145 may generate reports for an administrator that indicate whether data records satisfy predefined quality thresholds. Administration module 145 may enable a user of user device 125 to specify or modify acceptable thresholds ranges for data records. In some embodiments, administration module 145 provides threshold ranges to threshold module 165 of server 150.

Server 150 includes memory 155, a network interface 130, at least one processor 135, and a database 180. Memory 155 may include a data analysis module 160, a threshold module 165, an anomaly detection module 170, and a report module 175. In general, server 150 monitors data records and ensures that data records meet quality metrics. Server 150 may include internal and external hardware components, as depicted and described in further detail with respect to FIG. 6.

Data analysis module 160, threshold module 165, anomaly detection module 170, and report module 175 may include one or more modules or units to perform various functions of present invention embodiments described below. Data analysis module 160, threshold module 165, anomaly detection module 170, and report module 175 may be implemented by any combination of any quantity of software and/or hardware modules or units, and may reside within memory 155 of server 150 for execution by a processor, such as processor 135.

Data analysis module 160 may analyze raw data records that are received from one or more databases 115 of tenants 105A-105N. In general, data analysis module 160 may analyze raw data records to generate data quality metrics. Each record may have one or more fields with a separate record value for each field. In some embodiments, data analysis module 160 generates a data quality metric for each field of a group of records received from the same data source. Data analysis module 160 may analyze data records periodically, or may analyze records in an ad hoc fashion as the records are made available by a tenant server. In some embodiments, data analysis module 160 is implemented using Spark®, and data records are stored in the Hadoop® Distributed File System (HDFS). Data analysis module 160 may analyze records from many data sources (e.g., databases 115 of tenant servers 110) in parallel. While data sources may contain nested objects, such as in Apache Avro™, data analysis module 160 may flatten each object into a table row containing a key column corresponding to the data source (e.g., database 115), and value columns containing raw data of the records.

Threshold module 165 may manage threshold ranges that are applied to data quality metrics. Each threshold range may include a numerical interval that provides boundaries for favorable values of a data quality metric. In some embodiments, a user of user device 125 may provide threshold ranges to threshold module 165 via administration module 145. Threshold module 165 may organize threshold ranges according to the data quality metrics to which each threshold range applies, and by data source. For example, there may be one set of threshold ranges that are applied to records originating from a first location, and another set of threshold ranges that are applied to records originating from a second location. The difference in threshold ranges may reflect difference requirements of the first and second location. For example, a billing department may not populate laboratory result fields, but a laboratory department would populate that field, so the billing department may select a threshold range reflecting the expectation that 0% of the billing records should have laboratory result fields that are populated, whereas the laboratory department might select a threshold range of 50%-100%, since at least half of the laboratory records should have laboratory result fields that are populated.

Threshold module 165 may support a rollup threshold schema in which general threshold ranges are provided for fields and metrics that apply to all population levels of a tenant, and in which explicit threshold ranges can be provided for fields and metrics at any sub-population level. For example, a threshold range may be universally applied to the birth date field of all records, a broad threshold range might be applied to a particular description code field of records in a hospital, and a narrower threshold range might be applied to a particular department (e.g., sub-population) of the hospital that has stricter data quality requirements. Threshold module 165 may store threshold ranges in a table organized according to data source and record field, and may check the integrity of the threshold table in order to find errors such as duplicate entries, record values falling outside of an acceptable range, or conflicting rows. In some embodiments, threshold module 165 stores threshold ranges in a relational database.

Anomaly detection module 170 may apply threshold ranges to data quality metrics in order to identify any records that may be indicative of poor data quality. Anomaly detection module 170 may use threshold ranges that are matched with the most specific-matching population keys of records. A population key indicates the source of the data record field with the greatest amount of specificity. For example, a population key may specify that a field of a data record originated from a particular sub-department of an organization. Once a matching threshold range is selected, anomaly detection module 170 compares the corresponding data quality metric to the threshold range. If a data quality metric satisfies the threshold range, the data quality metric is labeled as good, and if not, then the data quality metric is labeled as poor.

Report module 175 may generate a report that visualizes the quality of data records. In some embodiments, report module 175 generates a report in a spreadsheet format, such as Microsoft® Excel®. Report module 175 may share the report with one or more members of an organization, such as a user of user device 125. In some embodiments, report module 175 may notify particular members of an organization when a relevant quality metric does not satisfy the selected threshold range. For example, if a particular department of an organization has low data quality, report module 175 may notify a designated user who is a member of that department.

Database 180 may include any non-volatile storage media known in the art. For example, database 180 can be implemented with a tape library, optical library, one or more independent hard disk drives, or multiple hard disk drives in a redundant array of independent disks (RAID). Similarly, data on database 180 may conform to any suitable storage architecture known in the art, such as a file, a relational database, an object-oriented database, and/or one or more tables. Database 180 may store data corresponding to data records, data quality metrics, threshold ranges, and data quality reports.

Figure 2:
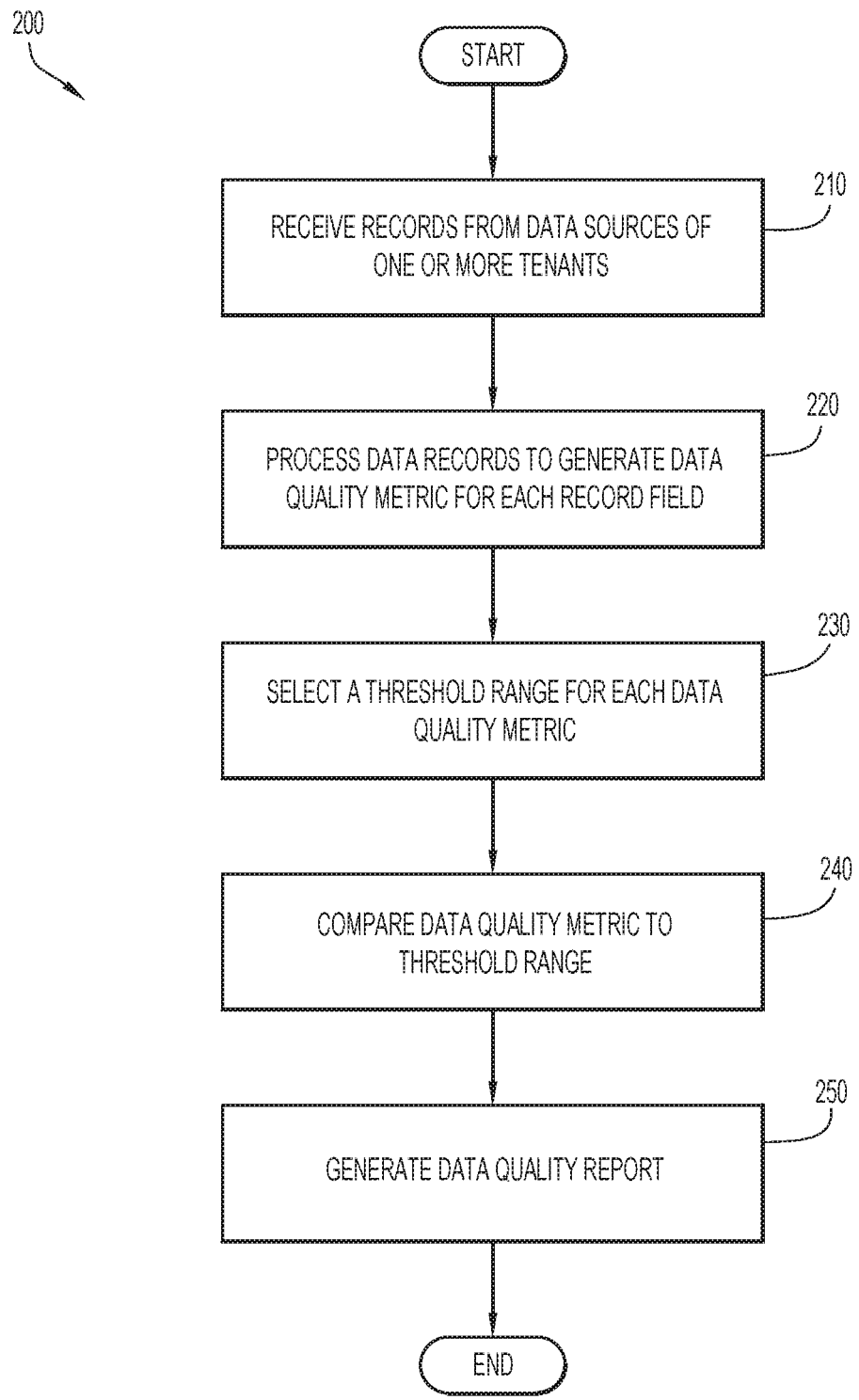
FIG. 2 is a flow chart depicting a method of ensuring the quality of data records in a multi-tenant environment in accordance with an embodiment of the present invention.

FIG. 2 is a flow chart depicting a method of ensuring the quality of data records in a multi-tenant environment in accordance with an embodiment of the present invention.

Data records from data sources of one or more tenants are received at operation 210. Data records may be received from data sources spanning one or more tenants in a multi-tenant environment, such as database 115 of tenant server 110A, database 115 of tenant server 110N, database 115 of tenant server 110X, and the like. Each data record may include multiple fields each having separate record values. For example, a data record may have a name field, a gender field, and a date field, with each field containing a separate record value. Data records may be received by server 150 periodically, or a record or set of records may be sent to server 150 when the record or set of records becomes available.

The data records are processed to generate data quality metrics for each record field at operation 220. The raw data values of data records may be processed by counting the record values of each field of a set of records according to a particular quality. Counts may be stored in a histogram, and data quality metrics may then be generated. For example, record values that are null or empty may be counted and compared to record values that are non-null, and a data quality metric may be determined that reflects the percentage of null record values in a given field of a set of records. Various invention embodiments may compare the number of record values that contain any error, such as null entries, typographical errors, values falling outside of an acceptable range, dates in the future for historical data records (e.g., future birthdates), and the like. Data quality metrics may be generated by data analysis module 160. The generation of data quality metrics will be described in further detail below with reference to FIGS. 3A-3D.

A threshold range is selected for each data quality metric at operation 230. Threshold ranges may be selected based on a combination of data field and level of specificity of the data source of a set of records. According to a rollup threshold schema, a data quality metric may be matched with a threshold range that is general to the field and metric and applies to all population levels, unless there is a more specific threshold range available for the data quality metric. In some embodiments, threshold ranges are selected by threshold module 165 and/or anomaly detection module 170 of server 150.

The data quality metric is compared to the selected threshold range at operation 240. Each data quality metric may be compared to a selected threshold range by anomaly detection module 170, which determines whether the data quality metric falls within the selected threshold range. A data quality report is generated at operation 250 that indicates whether data quality metrics fall within the selected threshold ranges. The data quality report may be generated by report module 175 of server 150, and may be sent to one or more users of an organization, such as a user of user device 125. Data quality reports may be stored in database 180. In some embodiments, a user of user device 125 can access past and present data quality reports using administration module 145.

Figure 3B:
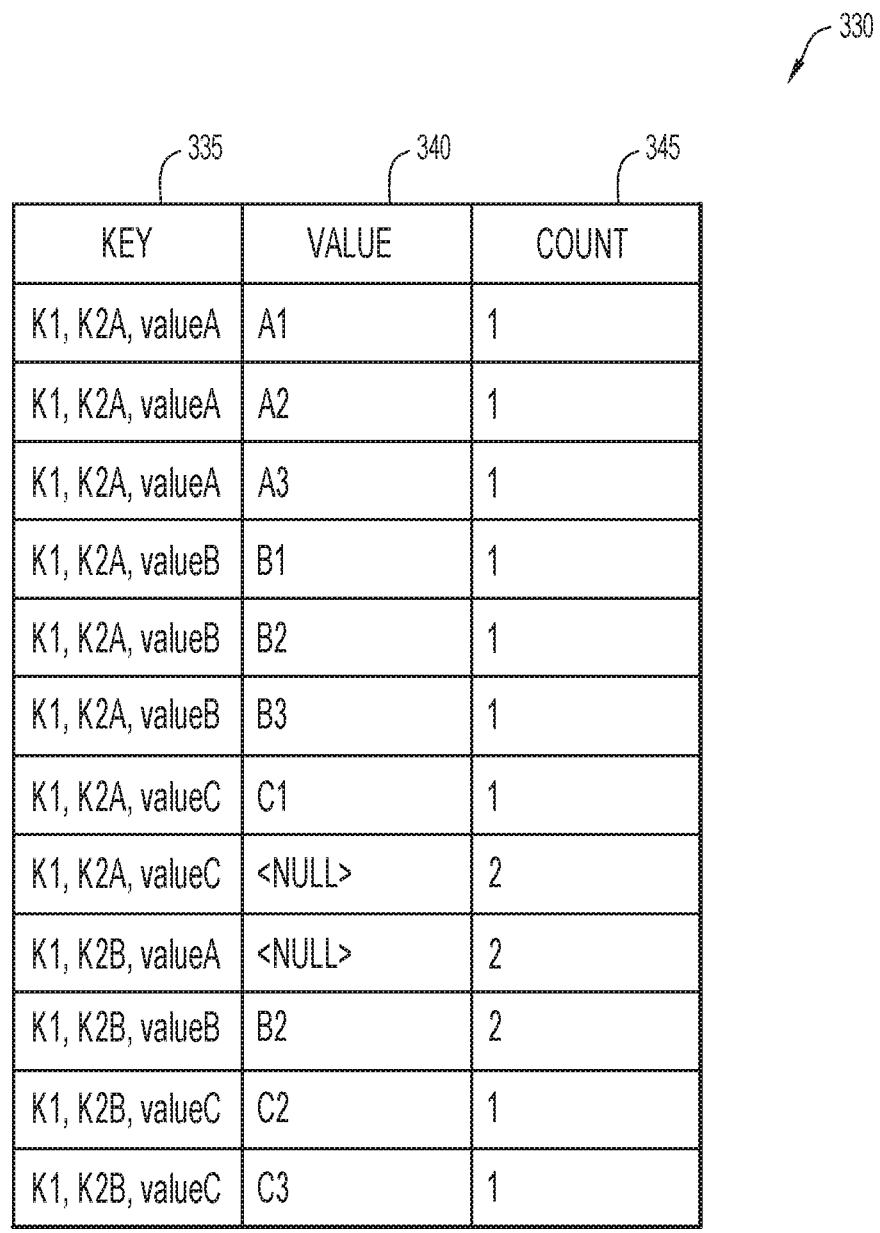

FIGS. 3A-3D are tables depicting stages of processing data records in accordance with an embodiment of the present invention. FIG. 3A depicts a table 300 of data records that are organized according to the data source, as represented by customer field 305 and system field 310. Table 300 may be received by data analysis module 160 from a single tenant server, such as tenant server 110X. As depicted, there is one customer K1, and there are two sub-populations, K2A and K2B, that are sources of data records. Customer K1 may represent a single tenant in a multi-tenant environment, and systems K2A and K2B may represent different facilities of the organization associated with the tenant. ID field 315, gender field 320, and birth year field 325 are fields that contain record values for each record of table 300.

FIG. 3B depicts a table 330 of key-value combinations, and may be generated by data analysis module 160. Key field 335 may represent each unique combination of data sources and fields, value field 340 may represent a indicate value, and count field 345 may indicate the count of that value for the combination of key and field. ValueA may correspond to an ID field value, valueB may correspond to a gender field value, and valueC may correspond to a birth year value. Each unique key-value combination is given its own row in table 330 with the count value 345 indicating the number of occurrences. For example, since key K1, K2A, valueA has three distinct values in table 300 (1142, 1143, and 1144), then table 330 contains three corresponding key-value-count rows. Furthermore, since the key K1, K2B, valueA combination has two instances of null values, the value of null is indicated in value field 340, and the count of two is indicated in count field 345.

Figure 3C:
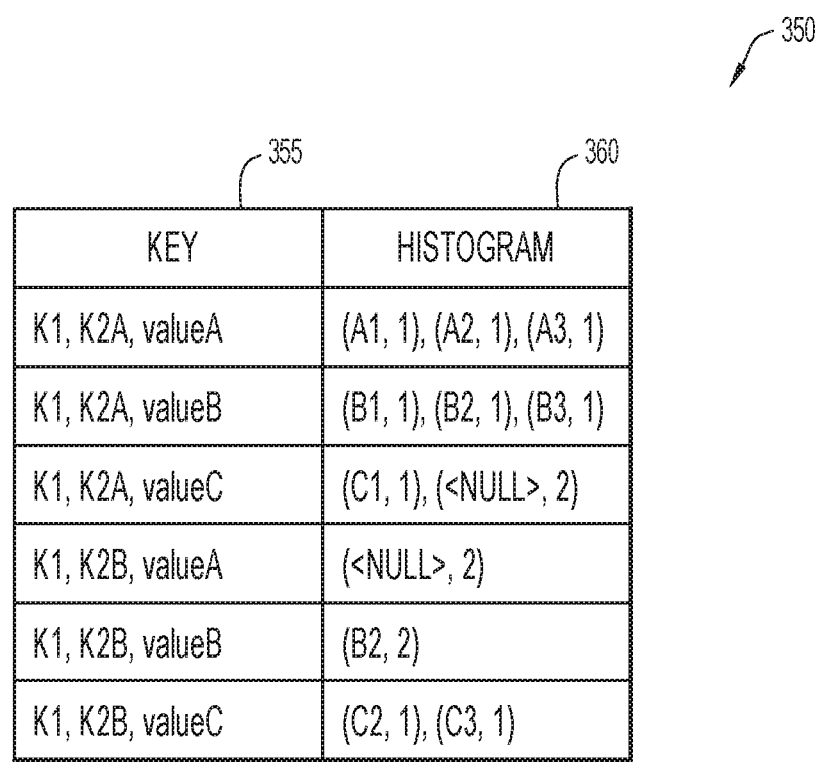

FIG. 3C depicts a table 350 of histograms by key. In some embodiments, data analysis module 160 generates table 350 based on table 330. Table 350 thus includes each unique key combination in key field 355, and the corresponding histogram information in histogram field 360. Using the histogram information, data analysis module 160 may then generate table 365 (FIG. 3D) by evaluating each row of table 350. Table 365 includes key field 370, metric field 375, and result field 380. In this example, number of null values and number of distinct values are computed as separate counts. In various embodiments, application-specific logic can determine which metrics should be calculated for a given key based on factors such as the data type, originating column, or data source. Thus, result field 380 may contain data quality metrics that are specific to a data source and a record field. The data quality metrics may then be compared to a threshold range in order to evaluate the data quality. For example, key-value combination K1, K2B, valueA may indicate poor quality records if the data threshold dictates that there should be no more than one null entry, since the null entry count of K1, K2B, valueA is two.

FIG. 4A is a table 400 of data quality thresholds in accordance with an embodiment of the present invention. As depicted, table 400 includes a row number field 405, three population level fields 410, 415, and 420, a field indication field 425, a metric field 430, and a threshold range field 435. Table 400 may be an example of a rollup threshold schema in which threshold ranges are defined according to various levels of specificity of a data source and field, with asterisks representing wildcards.

Row number field 405 may indicate an ID of each combination of population specificity, record field, and data quality metric. Population level fields 410, 415, and 420 correspond to levels of increasing specificity of data sources of a tenant. For example, rows 1 and 2 may apply to any tenant, since all population level entries are wildcards. Similarly, row 3 may apply to any data source at Hospital1 of Tenant1, and row 4 may apply to a data source associated with the billing department of Hospital1 of Tenant1. Threshold ranges may thus be provided at any level of specificity by defining data threshold ranges for every combination of data source and field.

FIG. 4B is a table depicting a data quality report 440 in accordance with an embodiment of the present invention. Data quality report 440 includes an indication of data sources via population level fields 410, 415, and 420, a field indication field 425 indicating the field of data records, a metric field 430 indicating the data quality metric associated with the field, and the value of the data metric in metric value field 445. Row field 405 indicates the rows that have been matched to the combinations of data source and fields, and matched thresholds field 435 indicates the threshold ranges that correspond to those combinations. Data quality report 440 further includes quality field 450, which indicates whether the value of each entry in metric value field 445 falls within the corresponding threshold ranges of matched threshold field 435. As depicted, data quality report 440 indicates that row 2 has poor data quality, as the ICD % data quality metric is 30%, which is outside of the threshold range of 50%-100%.

FIGS. 5A-5C are tables depicting a weighted thresholding schema in accordance with an embodiment of the present invention. Table 500 depicts threshold settings for various population level fields 505-525. Table 530 depicts weight fields 535-555, with each weight corresponding to a population level in table 500.

Table 560 depicts resulting metric thresholding decisions. Score field 565 indicates scores calculated for a given row of table 560 against each row of table 500, and threshold row 570 indicates the thresholds that are selected as a result of the calculated scores. For example, the first row of table 560 has a score of zero as evaluated against the first row of table 500, since none of the population level fields 505-525 match. The first row of table 560 has a score of twelve as evaluated against the second row of table 500, since "Hospital," and "Labor and Delivery" match. As those correspond to weight fields 540 and 545, weight field 540 has a weight of four, and weight field 545 has a weight of eight, the total for score is twelve. Wildcard values (e.g., as indicated by asterisks) may be ignored, and fields that do not match may be treated as negative values and therefore deducted. Once a row of table 560 is evaluated against all four rows of table 500, the highest value may selected, and the corresponding threshold may be applied. The highest value in score field 565 of first row of table 560 is sixteen, which is the score when evaluated against the fourth row of table 500 (as "E4112" and "LD043" both match, and their weights are eight each). Therefore, the threshold range of the fourth row, "48-52%," is applied to the first row of table 560.

In some embodiments, the weights and/or threshold ranges are dynamically tunable based on analysis of prior record quality history. Conventional or other machine learning techniques may be utilized to modify population level values and threshold range values of entries in table 500, and/or to add new entries or to remove entries. Similarly, conventional or other machine learning techniques may be employed to add, remove, or modify weights of table 530. For example, machine learning may be used to provide newly-added data sources with threshold ranges and/or weights based on the similarity of the newly-added data sources to pre-existing data sources.

Figure 6:
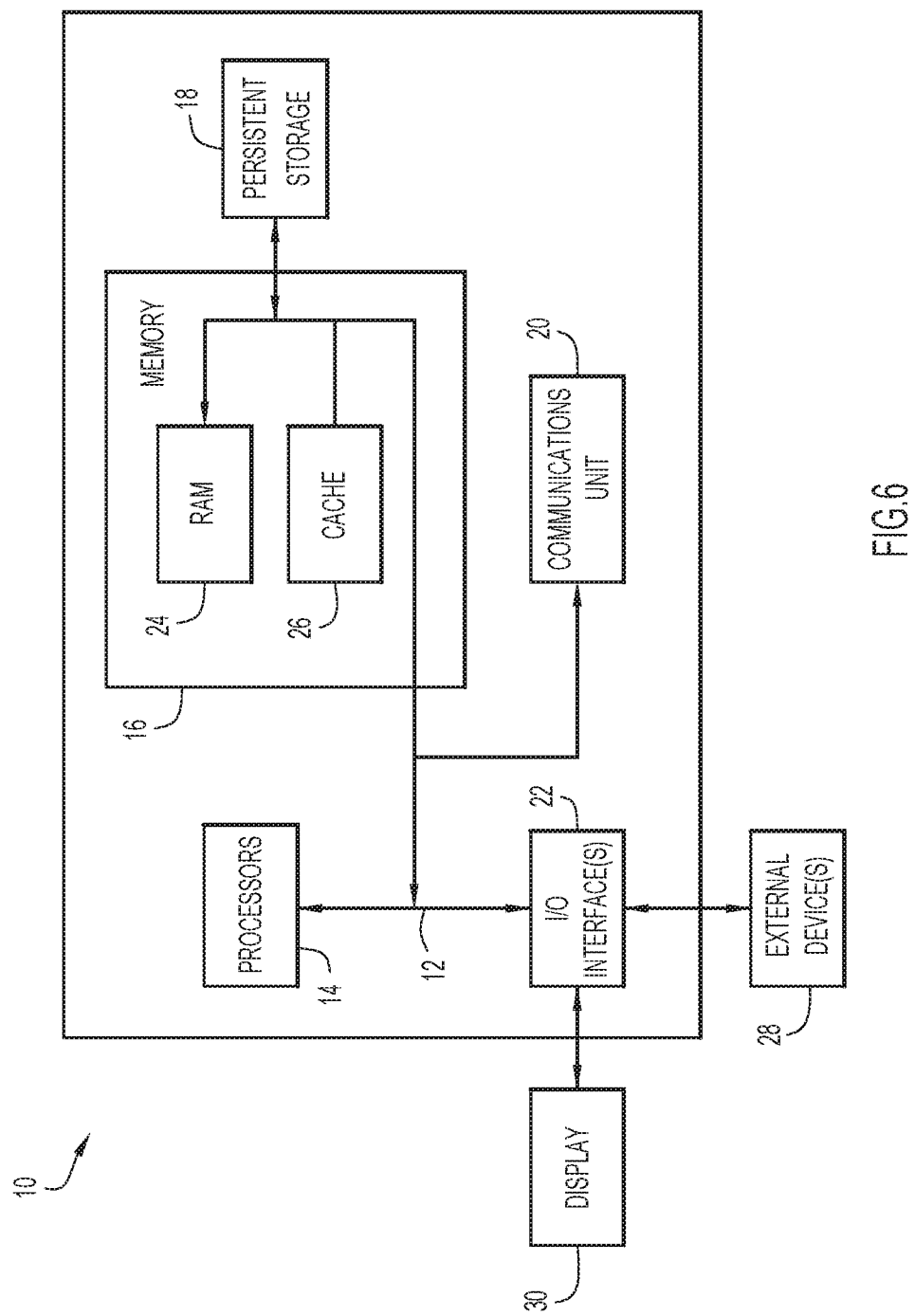
FIG. 6 is a block diagram depicting a computing device in accordance with an embodiment of the present invention.

FIG. 6 is a block diagram depicting components of a computer 10 suitable for executing the methods disclosed herein. Computer 10 may implement tenant servers 110A-110N, tenant server 110X, user device 125, and/or server 150 in accordance with embodiments of the present invention. It should be appreciated that FIG. 6 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to ensuring quality of data records in a multi-tenant environment (e.g., data records, data quality metrics, threshold ranges, organizational hierarchical data, etc.) may be stored within any conventional or other data structures (e.g., files, arrays, lists, stacks, queues, records, etc.) and may be stored in any desired storage unit (e.g., database, data or other repositories, queue, etc.). The data transmitted between tenant servers 110, user device 125, and/or server 150 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to ensuring quality of data records in a multi-tenant environment (e.g., data records, data quality metrics, threshold ranges, organizational hierarchical data, etc.) may include any information provided to, or generated by, tenant servers 110, user device 125, and/or server 150. Data relating to ensuring quality of data records in a multi-tenant environment may include any desired format and arrangement, and may include any quantity of any types of fields of any size to store any desired data. The data relating to ensuring quality of data records in a multi-tenant environment may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to ensuring quality of data records in a multi-tenant environment), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of processing data records in a multi-tenant environment to ensure data quality.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, networking software, administration module 145, data analysis module 160, threshold module 165, anomaly detection module 170, report module 175, etc.). These systems may include any types of monitors and input devices (e.g., keyboard, mouse, voice recognition, etc.) to enter and/or view information.

It is to be understood that the software (e.g., server software, networking software, administration module 145, data analysis module 160, threshold module 165, anomaly detection module 170, report module 175, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, networking software, administration module 145, data analysis module 160, threshold module 165, anomaly detection module 170, report module 175, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to ensuring quality of data records in a multi-tenant environment). The database system may be implemented by any number of any conventional or other databases, data stores or storage structures (e.g., files, databases, data structures, data or other repositories, etc.) to store information (e.g., data relating to ensuring quality of data records in a multi-tenant environment). The database system may be included within or coupled to the server and/or client systems. The database systems and/or storage structures may be remote from or local to the computer or other processing systems, and may store any desired data (e.g., data relating to ensuring quality of data records in a multi-tenant environment).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of processing data records in a multi-tenant environment to ensure data quality, comprising:

processing a plurality of records from a plurality of data sources to provide a plurality of data quality metrics comprising a data quality metric for each field of the plurality of records based on record values in the field, wherein the data quality metric indicates a percentage of erroneous record values in the field, and wherein each data source of the plurality of data sources is defined according to one or more population levels corresponding to levels of increasing specificity of data sources of a tenant that, in combination, identify a specific data source;

selecting a threshold range for each data quality metric, wherein the threshold range for each data quality metric indicates a range of acceptable values for the data quality metric, wherein the threshold range is selected from a plurality of threshold ranges that are defined for every combination of data source, record field, and data quality metric, wherein the threshold range for each data quality metric is selected based on the specific data source corresponding to the data quality metric, wherein the population levels that identify the specific data source are used to select the threshold range based on a matching score determined according to a number of matchings between the one or more population levels and one or more population levels defined for each threshold range of the plurality of threshold ranges, wherein the one or more population levels that identify the specific data source are compared to the one or more population levels defined for each threshold range of the plurality of threshold ranges to determine match values, wherein a positive weighted value is selected for each match and a negative weighted value is selected for each mismatch, and wherein the match values for each threshold range are summed to obtain the matching score and the threshold range associated with a highest matching score is selected for each data quality metric;

comparing the data quality metric to the threshold range to determine whether the data quality metric violates the threshold range; and providing a data quality report for the plurality of records, wherein the data quality report indicates whether the data quality metric of each field violates the selected threshold range.

2. The computer-implemented method of claim 1, wherein the plurality of records is received from one or more tenants in a multi-tenant environment, and wherein the plurality of threshold ranges is specific to each data source of each tenant.

3. The computer-implemented method of claim 1, wherein processing the plurality of records from the plurality of data sources to provide a data quality metric further comprises:

processing record values of each field of the plurality of records to generate a key-value-count table;

converting the key-value-count table into a histogram; and processing the histogram to calculate data quality metrics for each field.

4. The computer-implemented method of claim 1, wherein the data quality metric for each field comprises a percentage of invalid record values in the field.

5. The computer-implemented method of claim 4, wherein an invalid record value comprises one of: a record value outside of a predetermined range for the field, and a null value.

6. A computer system for processing data records in a multi-tenant environment to ensure data quality, the computer system comprising:

one or more computer processors;

one or more computer readable storage media;

program instructions stored on the one or more computer readable storage media for execution by at least one of the one or more computer processors, the program instructions comprising instructions to:

process a plurality of records from a plurality of data sources to provide a plurality of data quality metrics comprising a data quality metric for each field of the plurality of records based on record values in the field, wherein the data quality metric indicates a percentage of erroneous record values in the field, and wherein each data source of the plurality of data sources is defined according to one or more population levels corresponding to levels of increasing specificity of data sources of a tenant that, in combination, identify a specific data source;

select a threshold range for each data quality metric, wherein the threshold range for each data quality metric indicates a range of acceptable values for the data quality metric, wherein the threshold range is selected from a plurality of threshold ranges that are defined for every combination of data source, record field, and data quality metric, wherein the threshold range for each data quality metric is selected based on the specific data source corresponding to the data quality metric, wherein the one or more population levels that identify the specific data source are used to select the threshold range based on a matching score determined according to a number of matchings between the one or more population levels and one or more population levels defined for each threshold range of the plurality of threshold ranges, wherein the one or more population levels that identify the specific data source are compared to the one or more population levels defined for each threshold range of the plurality of threshold ranges to determine match values, wherein a positive weighted value is selected for each match and a negative weighted value is selected for each mismatch, and wherein the match values for each threshold range are summed to obtain the matching score and the threshold range associated with a highest matching score is selected for each data quality metric;

compare the data quality metric to the threshold range to determine whether the data quality metric violates the threshold range; and provide a data quality report for the plurality of records, wherein the data quality report indicates whether the data quality metric of each field violates the selected threshold range.

7. The computer system of claim 6, wherein the plurality of records is received from one or more tenants in a multi-tenant environment, and wherein the plurality of threshold ranges is specific to each data source of each tenant.

8. The computer system of claim 6, wherein the instructions to process the plurality of records from the plurality of data sources to provide a data quality metric further comprise instructions to:
   process record values of each field of the plurality of records to generate a key-value-count table;
   convert the key-value-count table into a histogram; and
   process the histogram to calculate data quality metrics for each field.

9. The computer system of claim 6, wherein the data quality metric for each field comprises a percentage of invalid record values in the field.

10. The computer system of claim 9, wherein an invalid record value comprises one of: a record value outside of a predetermined range for the field, and a null value.

11. A computer program product for processing data records in a multi-tenant environment to ensure data quality, the computer program product comprising one or more computer readable storage media collectively having program instructions embodied therewith, the program instructions executable by a computer to cause the computer to:
   process a plurality of records from a plurality of data sources to provide a plurality of data quality metrics comprising a data quality metric for each field of the plurality of records based on record values in the field, wherein the data quality metric indicates a percentage of erroneous record values in the field, and wherein each data source of the plurality of data sources is defined according to one or more population levels corresponding to levels of increasing specificity of data sources of a tenant that, in combination, identify a specific data source;
   select a threshold range for each data quality metric, wherein the threshold range for each data quality metric indicates a range of acceptable values for the data quality metric, wherein the threshold range is selected from a plurality of threshold ranges that are defined for every combination of data source, record field, and data quality metric,
      wherein the threshold range for each data quality metric is selected based on the specific data source corresponding to the data quality metric,
      wherein the one or more population levels that identify the specific data source are used to select the threshold range based on a matching score determined according to a number of matchings between the one or more population levels and one or more population levels defined for each threshold range of the plurality of threshold ranges,
      wherein the one or more population levels that identify the specific data source are compared to the one or more population levels defined for each threshold range of the plurality of threshold ranges to determine match values, wherein a positive weighted value is selected for each match and a negative weighted value is selected for each mismatch, and
      wherein the match values for each threshold range are summed to obtain the matching score and the threshold range associated with a highest matching score is selected for each data quality metric;
   compare the data quality metric to the threshold range to determine whether the data quality metric violates the threshold range; and
   provide a data quality report for the plurality of records, wherein the data quality report indicates whether the data quality metric of each field violates the selected threshold range.

12. The computer program product of claim 11, wherein the plurality of records is received from one or more tenants in a multi-tenant environment, and wherein the plurality of threshold ranges is specific to each data source of each tenant.

13. The computer program product of claim 11, wherein the instructions to process the plurality of records from the plurality of data sources to provide a data quality metric further comprise instructions to:
   process record values of each field of the plurality of records to generate a key-value-count table;
   convert the key-value-count table into a histogram; and
   process the histogram to calculate data quality metrics for each field.

14. The computer program product of claim 11, wherein the data quality metric for each field comprises a percentage of invalid record values in the field.

15. The computer program product of claim 14, wherein an invalid record value comprises one of: a record value outside of a predetermined range for the field, and a null value.

* * * * *